United States Patent
Hughes, Jr.

(10) Patent No.: US 10,870,590 B2
(45) Date of Patent: Dec. 22, 2020

(54) ION EXCHANGE WATER SOFTENER

(71) Applicant: Gilles Joseph Hughes, Jr., Ridley Park, PA (US)

(72) Inventor: Gilles Joseph Hughes, Jr., Ridley Park, PA (US)

( * ) Notice: Subject to any disclaimer, the term of this patent is extended or adjusted under 35 U.S.C. 154(b) by 253 days.

(21) Appl. No.: 16/005,094

(22) Filed: Jun. 11, 2018

(65) Prior Publication Data

US 2018/0354816 A1    Dec. 13, 2018

Related U.S. Application Data

(60) Provisional application No. 62/517,985, filed on Jun. 11, 2017.

(51) Int. Cl.
*C02F 1/42* (2006.01)
*B01J 49/75* (2017.01)

(52) U.S. Cl.
CPC .............. *C02F 1/42* (2013.01); *B01J 49/75* (2017.01); *C02F 2001/425* (2013.01); *C02F 2201/005* (2013.01); *C02F 2209/03* (2013.01); *C02F 2209/40* (2013.01); *C02F 2209/42* (2013.01); *C02F 2303/16* (2013.01)

(58) Field of Classification Search
CPC ............ C02F 1/42; C02F 2001/425; C02F 2201/005; C02F 2209/03; C02F 2209/40; C02F 2209/42; C02F 2303/16; B01J 49/75
USPC ........................................... 210/190
See application file for complete search history.

(56) References Cited

U.S. PATENT DOCUMENTS

| | | | |
|---|---|---|---|
| 1,233,016 A | 7/1917 | Bartlett | |
| 1,423,132 A | 7/1922 | Magrath | |
| 1,611,422 A | 12/1926 | Duden | |
| 1,703,451 A | 2/1929 | McGill | |
| 1,873,305 A | 8/1932 | De Ville | |
| 2,006,287 A | 6/1935 | Wilbanks | |
| 2,347,201 A | 4/1944 | Lindsay | |
| 2,627,503 A | 2/1953 | Anderson | |
| 2,832,373 A | 4/1958 | Scholer | |
| 3,342,336 A | 9/1967 | Rose | |
| 4,698,272 A | 10/1987 | Inokuti et al. | |
| 6,521,132 B2 | 2/2003 | Hughes | |
| 2014/0138321 A1* | 5/2014 | Koch | B01J 49/53 210/687 |

* cited by examiner

*Primary Examiner* — Matthew O Savage
(74) *Attorney, Agent, or Firm* — Panitch Schwarze Belisario & Nadel LLP

(57) ABSTRACT

A self-regenerating ion-exchange water softener has an inlet connectable to a source of softenable water under pressure, a resin chamber connected thereto, and an outlet connected to the resin chamber. A salt chamber is located above the resin chamber and contains a water-soluble salt for regenerating the resin. A chamber connection allows controlled downward flow of fluid from the salt chamber to the resin chamber. A first normally-open pressure-sensitive valve closes in response to increased water pressure in the resin chamber, and normally permits a downward fluid flow from the salt chamber to the resin chamber. A passageway permits pressurized water to flow upwardly from the resin chamber to a point above the high-water mark of the salt chamber to generate salt solution for contacting and regenerating the resin, and has a discharge control above the high-water mark.

10 Claims, 1 Drawing Sheet

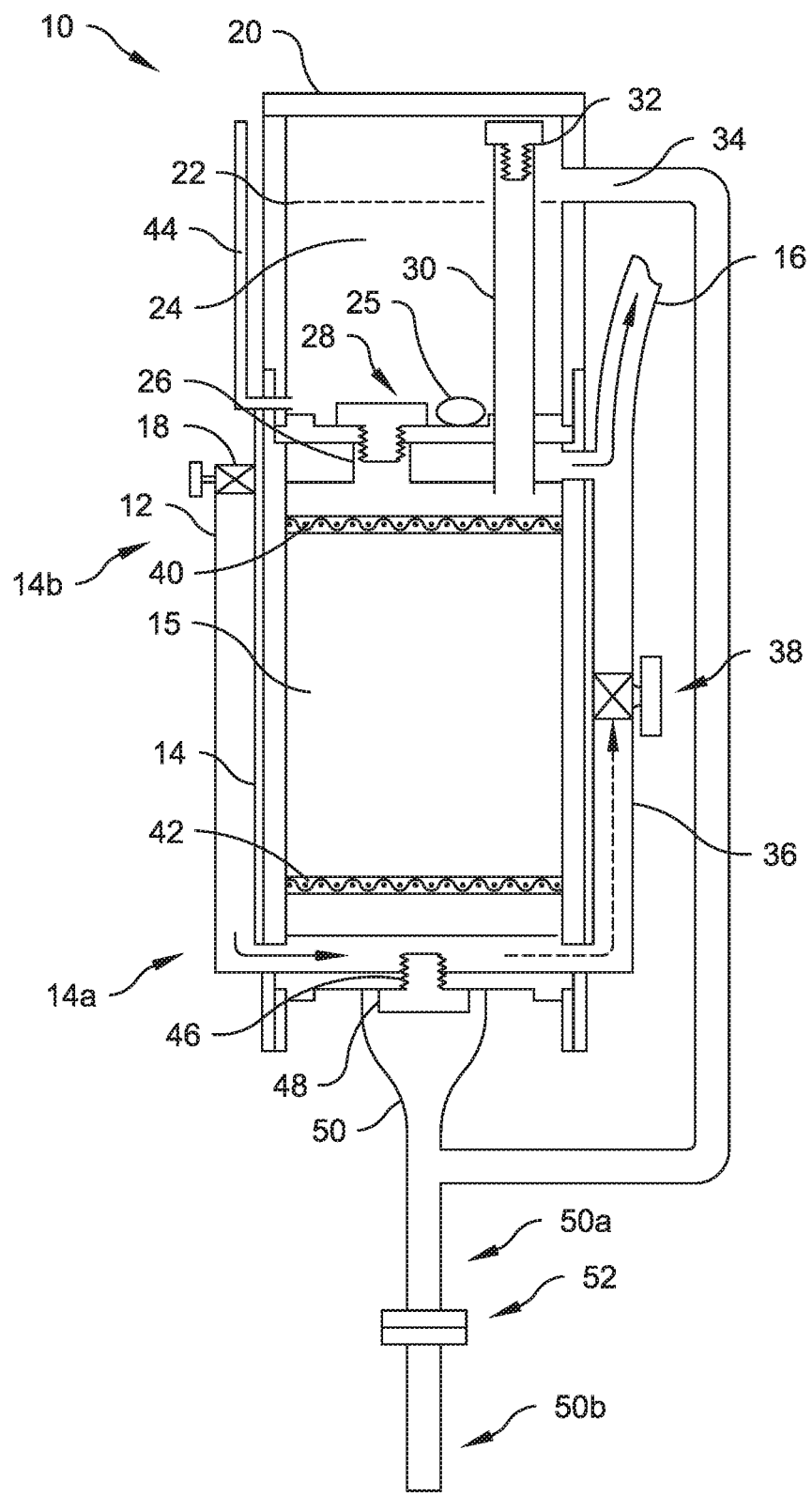

ION EXCHANGE WATER SOFTENER

CROSS-REFERENCE TO RELATED APPLICATIONS

This application claims the benefit of priority under 35 USC § 119(e) of U.S. Provisional Patent Application No. 62/517,985 filed Jun. 11, 2017, the contents of which are incorporated herein by reference.

BACKGROUND

The present inventor's U.S. Pat. No. 6,521,132 discloses an ion-exchange water softener, and particularly discloses a self-regenerating water softener, wherein an ion-exchange resin, after being depleted through use in water softening, is automatically regenerated by the simple act by the user of turning the water on for purposes of use, and turning it off after use. U.S. Pat. No. 6,521,132 further relates to an automatic method for regenerating the resin. The present disclosure also relates to an ion-exchange water softener and further discloses a method for regenerating the resin therein.

It is known regenerate a zeolite bed used for water softening, or to use a brine, such as sodium chloride brine, to regenerate a zeolite bed contained in a tank. U.S. Pat. No. 1,611,422 to Duden discloses a typical apparatus having a tank for the zeolite, a separate tank for salt and water, and a further separate compartment for brine that is used to regenerate the zeolite.

The devices of the prior art prior to U.S. Pat. No. 6,521,132 involve a substantial amount of piping and valving, and require considerable manipulation on the part of the person using the softened water. U.S. Pat. No. 6,521,132 avoids such complications, as a user may control the discharge of softened water using as few as a single valve. U.S. Pat. No. 6,521,132 also discloses a self-regenerating ion-exchange water softener that is not required to be permanently connected into the plumbing system of a house or factory, but instead can be moved from place to place as desired, merely by being connected to a source of raw water under pressure.

U.S. Pat. No. 6,521,132 also discloses a portable, eco-friendly, fully automatic water softener for personal use, with the device providing ease of installation (no additional plumbing needed) and providing target softening, which reduces the amount of contaminants in waste water that must be processed.

The present disclosure provides ion-exchange water softeners having the advantages of the devices disclosed in U.S. Pat. No. 6,521,132, while providing additional features and advantages not disclosed or suggested by U.S. Pat. No. 6,521,132.

BRIEF SUMMARY

Briefly stated, a self-regenerating ion-exchange water softener comprises a resin chamber containing an ion-exchange water-softening resin. The resin chamber has an inlet connectable to a source of softenable water under pressure. The resin chamber also has an outlet for discharging softened water. A salt chamber is located above the resin chamber and contains a water-soluble regeneration salt capable of forming salt solution for regenerating the resin. The salt chamber has a high-water mark corresponding to the highest level of fluid normally found in the salt chamber. A chamber connection extends between the salt chamber and the resin chamber and allows a flow of fluid from the salt chamber to the resin chamber. A first normally-open pressure-sensitive valve has an open state and a closed state and is positioned to control flow through the chamber connection. The first pressure-sensitive valve is positioned and configured to sense an increase of water pressure in the resin chamber and to move to the closed state in response thereto. The first pressure-sensitive valve is positioned and configured, when in the open state, to permit a controlled downward gravitational fluid flow from the salt chamber to the resin chamber through the chamber connection. A passageway is in fluid communication with the resin chamber to permit pressurized water to flow upwardly from the resin chamber to a point above the high-water mark of the salt chamber. The passageway has a discharge control for allowing controlled flow of water from the resin chamber to the point above the high-water mark of the salt chamber, to thereby place water in contact with the water-soluble salt in the salt chamber, to generate salt solution for contacting the resin and regenerating the resin.

BRIEF DESCRIPTION OF THE DRAWINGS

The following detailed description of embodiments of an ion-exchange water softener will be better understood when read in conjunction with the appended drawing. For the purpose of illustrating the same, there is shown in the drawing an embodiment which is presently preferred. It should be understood, however, that the invention is not limited to the precise arrangements and instrumentalities shown. In the drawing, the single FIG. is a schematic diagram of an ion-exchange water softener.

DETAILED DESCRIPTION OF THE INVENTION

Certain terminology is used in the following description for convenience only and is not limiting. The words "lower," "bottom," "upper," "top," "front," "back," and "rear" designate directions in the drawings to which reference is made. The words "inwardly" and "outwardly" refer to directions toward and away from, respectively, the geometric center of the component being discussed, and designated parts thereof, in accordance with the present disclosure. Unless specifically set forth herein, the terms "a," "an," and "the" are not limited to one element, but instead should be read as meaning "at least one." The terminology includes the words noted above, derivatives thereof, and words of similar import.

A water softener 10 comprises a resin chamber 14 containing an ion-exchange water-softening resin 15. The resin chamber 14 has an inlet 12 connectable to a source of softenable water under pressure. The softenable water may be any water-based fluid for which further conditioning via the resin 15 is desired. The resin chamber 14 includes an outlet for discharging softened water. A remote, user-controlled valve 18 may be provided at any convenient location to open up or shut off the flow of softenable water so that, when the user desires to use soft water, incoming water flows upwardly through the resin chamber 14 and is treated accordingly and discharged through the outlet 16 for delivery to the place of use.

The water softener 10 may include a by-pass conduit 36 and a by-pass valve 38 for controlling fluid flow therethrough to permit flow of untreated water without passing through the resin chamber, to allow the user to select whether untreated or treated water flows from the outlet 16. The by-pass conduit 36 (and the drain conduit 50 described below) may be of a rigid or flexible type of sufficient cross-sectional area to permit effective function of the particular conduit.

The water softener 10 may also include an upper porous body 40 and a lower porous body 42 disposed inside the resin chamber, with the resin 15 therebetween. The upper porous body 40 and the lower porous body 42 may include a screen, mesh, or other body selected to contain the resin 15 (with sufficiently small openings in the porous body) without unduly restricting fluid flow through the resin chamber.

A salt chamber 20 may be located above the resin chamber 14 and contains a water-soluble regeneration salt 25, which may be provided in the form of a powder, a cake, tablets, or other suitable form, the salt being capable of forming salt solution for regenerating the resin. The salt chamber may have a high-water mark 22, which is actually a horizontal line corresponding to the highest level of fluid normally found in the salt chamber 20. The location of the high-water mark 22 is not necessarily a physical feature of the salt chamber 20 and may instead be a line corresponding to a designed maximum depth of fluid in the salt chamber 20.

The water softener 10 may include a salt-chamber emergency drain 34 a salt-chamber emergency drain permitting fluid to flow from the salt chamber 20 upon the fluid 24 in the salt chamber 20 exceeding the high-water mark 22. In any event, the high-water mark 22 may mark the greatest depth (highest level) reached by fluid 24 in the salt chamber 20 during normal operations; as will be discussed below, fluid may be added to the salt chamber 20 above the high-water mark.

A chamber connection 26 extends between the salt chamber 20 and the resin chamber 14 and allows a flow of fluid 24 from the salt chamber 20 to the resin chamber 14. The chamber connection 26 may be a simple pipe or conduit as shown, or may include one or more passages of sufficient capacity for effective function of the device. A first normally-open pressure-sensitive valve 28 has an open state and a closed state and may be positioned to control flow through the chamber connection 26.

The first pressure-sensitive valve 28 may be positioned and configured to sense an increase of water pressure in the resin chamber 14 and to move to the closed state in response thereto. The first pressure-sensitive valve 28 may be positioned and configured, when in the open state, to permit a controlled downward gravitational fluid flow from the salt chamber 20 to the resin chamber 14 through the chamber connection 26, with, for example, a small leakage passageway provided through a threaded connection between the first pressure-sensitive valve 28 and the resin chamber 14. Other means of providing a controlled flow are described below in the discussion of discharge control 32.

The water softener 10 may include a visual indicator, which may be in the form of a sight glass 44 in fluid communication with a lower portion of the salt chamber to show a depth of fluid therein. The sight glass may take a variety of forms, such as a tube open to a lower portion of the salt chamber 20 and extending externally and upwardly therefrom; or the form of a window in a side wall of the salt chamber 20; or other forms of sight glasses or visual indicators known in the art. The visual indicator may take the form of a display of one or more lights or light-emitting elements or even a numerical display keyed to fluid depth in the salt chamber 20.

A passageway 30 may be in fluid communication with the resin chamber 14 to permit pressurized water to flow upwardly from the resin chamber 14 to a point above the high-water mark 22 of the salt chamber 20. The passageway 30 has a discharge control 32 for allowing controlled flow of water from the resin chamber 14 to the point above the high-water mark of the salt chamber 20, to thereby place water in contact with the water-soluble salt 25 in the salt chamber, to generate salt solution (fluid 24) for contacting the resin 15 and regenerating the resin 15.

The water softener 10 may comprise a resin-chamber discharge opening 46 at a lower portion 14a (compare lower portion 14b), of the resin chamber 14 and a second normally-open pressure-sensitive valve 48 having an open state and a closed state and positioned to control fluid flow through the resin-chamber discharge opening 46. The second pressure-sensitive valve 48 may be positioned and configured to sense an increase of water pressure in the resin chamber 14 and to move to the closed state in response thereto, and in the open state to permit a controlled downward gravitational fluid flow from the resin chamber 14. The water softener 10 may further comprise a drain conduit 50 in fluid communication with the resin-chamber discharge opening 46. The drain conduit may have an upper portion 50a and a lower portion 50b, the lower portion 50b being connected to the upper portion 50a by a breakaway connection 52, which upon application of a force tending to move the upper portion 50a with respect to the lower portion 50a, will release without damage to either the upper portion 50a or the lower portion 50b. The breakaway connection 52 may be any of a variety of devices known in the art, and given the nature of the fluids carried by the drain conduit 50, the sealing capability provided by commercially available breakaway couplings (where each end of the broken conduit is automatically sealed) may be eliminated in the interest of lower cost. Where a drain conduit 50 is employed, the salt-chamber emergency drain 34 may be a conduit joined to and in fluid communication with the drain conduit 50, as shown in the FIG.

An advantage in certain embodiments of the device is the automatic upward leakage of water into the salt chamber 20 by way of the passageway 30, which leads to the production of fluid 24 in the salt chamber 20 having salt 25 dissolved therein, followed by automatic gravity-driven downward flow of the resulting fluid 24 after the water pressure in the resin chamber 14 has been turned off by the user. This saves the user the annoyance and trouble of manipulating a complicated network of pipes and valves, and going to various locations in a building to do so, in order to place the water softener 10 in use, or to disconnect it from the existing plumbing circuits if desired.

Note that the first and second pressure-sensitive valves 28, 48 may be in the form of known pressure-sensitive valves, including but not limited to so-called umbrella valves. It will be appreciated that many different forms of discharge control 32 maybe used for the purpose of this invention, including the use of a valve fitted loosely in an opening in a manner to permit slow leakage therethrough. As another example, a restricted passageway may be cut through threads that are used in connecting a valve or plug into an opening in the passageway 30. Other means of obtaining such a restrictive flow will become immediately apparent to those skilled in the art, including the use of a valve that is incapable of closing instantly and therefore provides a time-regulated amount of water leakage into the upper salt tank before it completely closes.

The water softener disclosed herein may be installed in a built-in plumbing system in a home or factory, or may be a portable system needing only to be connected into a source of softenable water under pressure. chamber are actuated.

Various components of the water softener 10 are actuated automatically when the user turns the water on and subsequently turns it off.

A method of softening water includes the following steps: providing a water including all or a portion of the water softener 10 disclosed herein; connecting a source of softenable water to the inlet 12 of the water softener; initiating a flow of softenable water through the inlet 12; and receiving softened water from the outlet 16.

Certain embodiments of the water softener 10 are beneficial to a variety of skin conditions and are helpful in reducing shower and cleaning products. Embodiments of the water softener 10 may be used in households, nursing homes, hospitals, apartments, car-washing facilities, hotels and motels, RV's campgrounds, hair salons, and pet-care facilities.

It will be appreciated by those skilled in the art that changes could be made to the embodiments described above without departing from the broad inventive concept thereof. It is understood, therefore, that this disclosure is not limited to the particular embodiments disclosed, but it is intended to cover modifications within the spirit and scope of the present disclosure as defined by the appended claims.

What is claimed is:

1. A self-regenerating ion-exchange water softener comprising:
    (a) a resin chamber containing an ion-exchange water-softening resin,
    (b) the resin chamber having an inlet connectable to a source of softenable water under pressure, and the resin chamber having an outlet for discharging softened water,
    (c) a salt chamber located above the resin chamber and containing a water-soluble regeneration salt capable of forming salt solution for regenerating the resin, the salt chamber having a high-water mark corresponding to the highest level of fluid normally found in the salt chamber,
    (d) a chamber connection extending between the salt chamber and the resin chamber and allowing a flow of fluid from the salt chamber to the resin chamber,
    (e) a first normally-open pressure-sensitive valve having an open state and a closed state and positioned to control flow through the chamber connection, the first pressure-sensitive valve being positioned and configured to sense an increase of water pressure in the resin chamber and to move to the closed state in response thereto, and in the open state to permit a controlled downward gravitational fluid flow from the salt chamber to the resin chamber through the chamber connection;
    (f) a passageway in fluid communication with the resin chamber to permit pressurized water to flow upwardly from the resin chamber to a point above the high-water mark of the salt chamber, the passageway having a discharge control for allowing controlled flow of water from the resin chamber to the point above the high-water mark of the salt chamber, to thereby place water in contact with the water-soluble salt in the salt chamber, to generate salt solution for contacting the resin and regenerating the resin.

2. The water softener according to claim 1, further comprising a resin-chamber discharge opening at a lower portion of the resin chamber and a second normally-open pressure-sensitive valve having an open state and a closed state and positioned to control fluid flow through the resin-chamber discharge opening, the second pressure-sensitive valve being positioned and configured to sense an increase of water pressure in the resin chamber and to move to the closed state in response thereto, and in the open state to permit a controlled downward gravitational fluid flow from the resin chamber.

3. The water softener according to claim 2, further comprising a drain conduit in fluid communication with the resin-chamber discharge opening.

4. The water softener according to claim 3, wherein the drain conduit has an upper portion and a lower portion, the upper portion being connected to the lower portion by a breakaway connection.

5. The water softener according to claim 3, further comprising a salt-chamber emergency drain permitting water to flow from the salt chamber upon a fluid level in the salt chamber exceeding the high-water mark, wherein the salt-chamber emergency drain is a conduit joined to and in fluid communication with the drain conduit.

6. The water softener according to claim 1, further comprising a salt-chamber emergency drain permitting water to flow from the salt chamber upon a fluid level in the salt chamber exceeding the high-water mark.

7. The water softener according to claim 1, further comprising a visual indicator in fluid communication with a lower portion of the salt chamber to show a depth of fluid therein.

8. The water softener according to claim 1, including a by-pass conduit and a by-pass valve for controlling fluid flow therethrough to permit flow of untreated water without passing through the resin chamber.

9. The water softener according to claim 1, further comprising an upper porous body and a lower porous body disposed to define a volume inside the resin chamber, wherein the resin is secured therebetween.

10. A method of softening water, comprising:
    providing a water softener according to claim 1;
    connecting a source of softenable water to the inlet of the water softener;
    initiating a flow of softenable water through the inlet; and receiving softened water from the outlet.

* * * * *